United States Patent Office 3,449,280
Patented June 10, 1969

3,449,280
ADHESIVE COMPOSITION CONTAINING HIGH MOLECULAR WEIGHT POLYAMIDES, EPOXY RESINS AND CURING AGENTS
Robert A. Frigstad, St. Paul, Minn., assignor to Minnesota Mining and Manufacturing Company, St. Paul, Minn., a corporation of Delaware
No Drawing. Filed Apr. 27, 1960, Ser. No. 24,882
Int. Cl. C08g 45/12
U.S. Cl. 260—29.2
12 Claims

ABSTRACT OF THE DISCLOSURE

Adhesives and coating compositions are prepared from 13–98 parts of high molecular weight methanol-soluble polyamides and 2–87 parts of epoxy resin. In an example 85 parts of a terpolymer of caprolactam, hexamethylene diammonium adipate and hexamethylene diammonium sebacate were solvated in methanol and blended with 15 parts of a diglycidyl ether of bisphenol A and 3.6 parts of 2,-dihydrazino-6-methylamino-s-triazine.

---

This invention relates to adhesive compositons and is primarily concerned with flexible, solvent-free heat-activatable adhesive bonding films.

General purpose structural adhesives must develop high resistance to both shear and peel forces. In addition, they must be resistant to adverse conditions of use, e.g., high temperatures and humidity, salt spray, lubricating oils, etc. In aircraft, hydraulic fluids present a particularly vexing problem.

The most successful general purpose structural adhesives developed to date are based on epoxy resins which have more than one oxirane group per average molecular weight through which they can be crosslinked to a thermoset state. However, most epoxy resins cure to a somewhat brittle state and thus present poor resistance to peel forces. Those epoxy resins which do cure to a flexible state tend to be deficient in cohesive strength. By compounding the epoxy resins with various elastomers or other modifiers, or by effecting the crosslinking with long-chain materials, e.g., with aliphatic polysulfides or with polyamides made by reacting dimer and trimer vegetable oil acids with polyamines, these shortcomings can be mitigated, but often at the expense of some other important property such as resistance to heat or to chemical attack.

My invention provides a structural adhesive composition which more satisfactorily combines the qualities of good internal strength, high peel resistance and adequate resistance to heat and chemical attack than does any other adhesive composition of which I am aware. Moreover, it is conveniently marketed as a stably flexible, heat-activatable, tack-free bonding film which can be used without need for special ventilation. Alternatively, it can be marketed as a liquid, coatable adhesive cement.

Briefly, my novel adhesive composition comprises a blend of methanol-soluble nylon polyamide, epoxy resin and heat-activatable curing agent for epoxy resin, said polyamide being a long chain synthetic polymer which has recurring carbonamide groups as an integral part of the main polymer chain and is capable of forming strong cold drawn fibers. I would consider as "methanol-soluble" a nylon which is soluble to an extent that the solution includes at least 3–5% solids. Commercially available methanol-soluble nylons are soluble to at least this extent in other lower alkyl alcohols having up to about 4 carbon atoms, and these may be substituted for the methanol in making up liquid mixtures of the compositions of my invention. Preferably the nylon comprises from 40 to 95% of the total nylon plus epoxy resin, although as little as 13% and as much as 98% nylon have been used with significant improvement in specific properties compared to adhesive compositions of either the epoxy resin and curing agent or the nylon alone. Best results for most purposes have been attained at 70–85% nylon.

While most nylons are insoluble in methanol or other common organic solvents, a number of methanol-soluble nylons are commercially available. One of these is "Zytel" 61 which is an interpolyamide formed from hexamethylenediammonium adipate, hexamethylenediammonium sebacate and caprolactam, "Zytel" 63 is essentially the same as "Zytel" 61 but has a lower water content. Its melting point as determined by ASTM test D–789–53T is 300°–320° F. "Zytel" 69 is a methanol-soluble interpolyamide of the same type to which a plasticizer has been added and has a melting point of 285°–300° F. Both "Zytel" 63 and "Zytel" 69 have provided almost as good results in the practice of my invention as has "Zytel" 61.

Substituents on the nylon polymeric chain such as methyl groups also tend to render nylon soluble in methanol. The "BCI–800" series of nylons is methanol-soluble by virtue of N-alkoxyalkyl substituents, especially N-methoxymethyl groups, on a nylon 6,6 polymer. Particularly useful in my invention is "BCI–809" which has a dilution value of 45. Another member of this series which has to a lesser extent improved otherwise unmodified epoxy resin for structural adhesive uses is "BCI–829," the dilution value of which is 80. Also useful are nylon copolymers which are methanol-soluble. For further discussion of methanol-soluble nylons, see pages 15–24 of Floyd, Polyamide Resins, Reinhold 1958.

While any heat-curable epoxy resin is useful in my invention, the polyglycidyl ethers are preferred. Among those which have demonstrated utility, are condensation products of bisphenol A and epichlorhydrin such as "EKRB 2002" and the liquid "ERL 2774." The former has a Durrans' melting point of about 145–170° F. and an epoxide equivalent weight of 450–525. The latter has an epoxide equivalent weight of 175–210. Other useful epoxy resins are similarly prepared, e.g., by substituting other polyols such as glycerol or resorcinol for the bisphenol A. A polyglycidyl ether which cures to a less flexible state and so provides somewhat lower, but still satisfactory resistance to peel from metal and other solid surfaces is "Epon 1310," which is understood to be the condensation product of 1,1,2,2-tetrakis(4-hydroxyphenyl)ethane and epichlorhydrin having an average of about three glycidyl ether groups in the molecule. This resin has a Durrans' melting point of about 77–80° C. and an epoxide equivalent weight of about 208. Another class of epoxy resins which has been blended with methanol-soluble nylon with good results in the practice of my invention is epoxidized novolak, e.g., the semi-liquid "DEN–438" which has an epoxide equivalent weight of about 180. Shown to be of marginal utility was epoxy resin including a plurality of epoxy cyclohexane groups, specifically "EP–201" which is understood to have the formula:

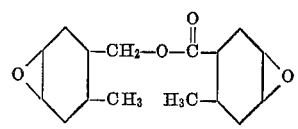

Although its manufacturer, Union Carbide Chemicals Co., suggests that "EP–201" be hardened with an acidic curing agent, better results were attained with alkaline curing agents in the practice of this invention.

My invention will now be illustrated by a number of working examples in which all parts are given by weight.

Example 1

|  | Parts by Wt. |
|---|---|
| Methanol-soluble nylon (Zytel 61) | 85 |
| Methanol | 268 |
| Water | 55 |
| Furfuryl alcohol | 17 |
| Liquid epoxy resin ("ERL 2774") | 15 |
| 2,4-dihydrazino-6-methylamino-s-triazine | 3.6 |

The nylon was solvated in the methanol and water at 150° F. with constant agitation under total reflux for 2 hours until no particles of nylon could be seen in a sample of the solution. Separately, the epoxy resin and triazine curing agent were stirred with an electric mixer for 20 minutes and passed twice through a paint mill, with additional mixing for 20 minutes between passes and for 30 minutes after the second pass. With the temperature of the nylon solution reduced below 100° F., the epoxy resin and curing agent were added with agitation over a period of 30 minutes to produce a milky liquid. When the viscosity (Brookfield #3 spindle, 20 r.p.m.) reached 2000 cps., the milky liquid mixture was knife-coated on polyethylene-coated kraft paper liner and dried in an oven, initially at 110° F. and finally at 185° F. until the solvent was removed in about 15 minutes, providing a dried adhesive layer about 6 mils in thickness. Over this adhesive coating was applied an additional coating of the same solution of nylon-epoxy resin-curing agent to build the adhesive coating, after solvent removal, to a total thickness of 10 mils. The whole was then wound into roll form for storage or shipment.

The dried film was used to adhesively bond two 8" x 8" sheets of 0.032-inch thick 2024T3 clad aluminum which had previously been cleaned and etched by the following procedure:

Vapor degrease—perchloroethylene vapors for 5–10 minutes;

Alkaline degrease—"Oakite 164" solution (9–11 oz./gallon water) at 180° F. for 10–20 minutes and rinse with liberal quantities of cold water;

Acid etch—place in solution of 30 parts distilled water, 10 parts conc. sulfuric acid, 1 part sodium dichromate for 10 minutes at 150° F.;

Rinse—in clear running water;

Dry—15 minutes at room temperature followed by 10 minutes at 150° F.

After being thus cleaned and etched, the aluminum was sprayed with the following primer composition:

|  | |
|---|---|
| Methanol-soluble nylon (Zytel 61) | 100 |
| Methanol | 1320 |
| Water | 74 |
| Furfuryl alcohol | 20 |
| "A stage" phenol-formaldehyde resin | 57.2 |
| Ethylene glycol monoethyl ether | 5 |

The phenol-formaldehyde resin had a ratio of 1 mol phenol to 2 mols formaldehyde and a water tolerance of 45 or less. The primer layer dried in 30 minutes at room temperature followed by 30 minutes at 200°–250° F. to a thickness of about 0.5 mil.

The dried nylon-epoxy film was flattened against the primer layer of one of the aluminum sheets using a hard roller on the polyethylene-kraft liner, leaving a 2-inch adhesive-free area at one edge of the sheet. The liner was then stripped away, and the second aluminum sheet was placed with its primer layer against the exposed adhesive layer. The whole was placed in a heated platen press under 50 pounds per square inch, and the temperature was increased at 10° F. per minute to 300° F., held at that temperature for 40 minutes to cure the adhesive, and cooled below 200° F. before removal.

"T-Peel" adhesion was tested by cutting out 1" x 8" strips, the end two inches of which were adhesive-free, and by gripping the unbonded edges in the jaws of a tensile tester and peeling the aluminum sheets apart at a 90° angle to the bond line or 180° in relation to each other at a jaw separation rate of 20 inches per minute. Average peel values in pounds per inch of width at various test temperatures on these primed sheets and on identically bonded aluminum sheets, except for omission of the primer, are recorded in Table A (with peel values in pounds per inch width). The results of this test at sub-zero temperatures are superior to, and the results at 75° F. and at elevated temperatures are as good as, any adhesive of which I am aware.

TABLE A

| Test temperature | Primed sheets | | Unprimed sheets | |
|---|---|---|---|---|
| | Peel value | Type failure | Peel value | Type failure |
| −90° F | 24 | Cohesive | | |
| −67° F | 26 | ---do--- | 23 | Cohesive. |
| −40° F | 38 | ---do--- | 38 | 70% cohesive. |
| 75° F | 175 | Adhesive | 197 | 80% cohesive. |
| 180° F | 85 | ---do--- | 130 | 60% cohesive. |
| 250° F | 49 | ---do--- | 63 | Cohesive. |

Previously cleaned, etched and primed or unprimed aluminum 4" x 7" panels, as described above except with a thickness of 0.063 inch, were bonded with ½-inch overlap along their 7-inch dimension in a heated platen press with the same nylon-epoxy adhesive bonding film as in the above "T-Peel" test. The adhesively bonded panels were then sawed into one-inch wide strips extending crosswise to the bonded area. The strips were subjected to a steady longitudinal pull in accordance with U.S. government specification MIL-A-5090B to produce average results shown in Table B (with shear values in pounds per square inch).

TABLE B

| Test temperature | Primed panels | | Unprimed panels | |
|---|---|---|---|---|
| | Shear value | Type failure | Shear value | Type failure |
| −90° F | 5,700 | Adhesive | | |
| −67° F | 7,300 | ---do--- | 7,500 | Adhesive. |
| −40° F | 7,400 | ---do--- | 7,500 | 50% adhesive. |
| 75° F | 4,200 | 70% adhesive | 5,400 | Adhesive. |
| 180° F | 2,500 | ---do--- | 4,100 | 70% cohesive. |
| 250° F | 1,600 | 50% adhesive | 3,300 | 50% adhesive. |

This shear test is widely accepted in the aircraft industry as a screening test, usually with the requirement that the adhesive bond withstand at least 2,500 pounds over a required range of temperatures, for example, from −65° to 180° F. Although many other adhesive compositions provide equal or better shear values, the adhesive bonding film of this example is superior in its resistance to lubricating oils, hydraulic fluids and other materials to which adhesives are often exposed in aircraft use.

From the data recorded in Tables A and B, there would appear to be no advantage to priming the aluminum. However, where exposure to salt spray, prolonged high humidity or certain other adverse conditions is contemplated, the priming treatment has been found to extend the useful life of the adhesive bond.

Example II

The nylon-epoxy adhesive composition of Example I was coated on a polyethylene-coated kraft paper liner and dried to a thickness of about 5 mils. Over this non-sticky dried coating was coated at a temperature of 160° F., while simultaneously introducing lightweight cotton scrim cloth (i.e., loosely woven bleached cotton cloth having a thread count per square inch of 20 by 24 and a weight of .01 pound per square foot), a layer of a nylon-epoxy resin composition in which the nylon was in powder form and served as a viscosity-controlling filler. This nylon powder-epoxy resin composition was prepared by blending 5 parts of finely divided silica powder into 50 parts of liquid epoxy resin ("ERL–2774"); adding to this in a paint mill 16.8 parts of 2,4-dihydrazino-6-methylamino-s-triazine as curing agent for the epoxy resin; dispersing 10 parts of 100 mesh or finer nylon powder ("BCI–809") into the mixture; and melting 50 parts of solid epoxy resin ("EKRB-2002") and adding it to the equally hot dispersion. After the second coating cooled to a nonsticky condition, a sheet of 2-mil polyethylene was applied as a protective barrier. The composite adhesive bonding film thus formed with protective layers on either side was wound into a roll for storage or shipment.

This composite film remains flexible and heat-curable after storage for long periods at room temperature and is particularly adapted for bonding aircraft skin panels to honeycomb core, as illustrated by the following procedure: The kraft paper liner was removed, and the exposed layer was placed against 0.020-inch thick 2024T3 clad aluminum sheet which had been cleaned and etched as in Example I. A hard rubber roller was used to flatten the composite film against the sheet. The polyethylene liner was then removed and a clean aluminum honeycomb core (3/16" cell, perforated, 5/8" thick, 5052 aluminum alloy, 2 mil foil) was placed on the composite adhesive film. An identical adhesive-bearing aluminum sheet was laid against the other side of the honeycomb core, and the whole was placed in a heated platen press under 50 pounds per square inch. Simultaneously heat was applied to increase the temperature at a rate of 10° F. per minute to 300° F., which was maintained for 40 minutes. During the heating, the adhesive layer containing nylon powder filleted around the edges of the honeycomb core and cured to a thermoset state of exceedingly high shear strength. At the same time, the layer including the dissolved nylon cured and anchored firmly in a peel-resistant manner to the skin panel. The strength of an adhesive bond thus formed was so great that it remained essentially undamaged in beam flexure tests in which the honeycomb core failed.

To test the resistance of this honeycomb structure to environmental aging under various conditions, 3" x 8" panels cut from the cured structure were exposed for 30 days to the conditions noted in Table C and then tested for peel strength at 75° F. by U.S. government specification MIL-A-25463 (Para. 4.6.1-4.6.3). A peel strength of over 8.5 inch pounds per inch of width is satisfactory. The remarkably good resistance to "Skydrol 500," which is believed to be essentially tricresyl phosphate, is particularly significant, since most structural adhesives dissolve or weaken badly in the presence of this hydraulic fluid.

TABLE C

| Environment | Environment temperature, °F. | Honeycomb peel strength (in. lbs./in.) | Type failure |
|---|---|---|---|
| Salt spray (MIL STD 151) | 100 | 44 | Cohesive. |
| 100% relative humidity | 120 | 34 | Do. |
| "Skydrol 500" (MIL-O-5606) | 160 | 30 | Do. |
| Air | 75 | 35 | Do. |

Example II(a)

By changing the curing agent in the adhesive bonding film of Example I to dicyandiamide so that the epoxy resin did not begin to cure to an appreciable extent until the temperature was increased above 325° F., the nylon melted before the resin gelled and so behaved in much the same way as the filleting layer of the composite film of Example II. Thus, when used in constructing a honeycomb structure, the modified homogeneous film of Example I filleted to provide good shear resistance and in addition anchored firmly in a peel-resistant manner to the skin panel.

Example III

Shear and peel values were obtained as in Example I for adhesive compositions which were identical to that of Example I except that the proportion of nylon to epoxy resin was varied, the aluminum sheets were unprimed, and the platen press was carried to 350° F. for 60 minutes. In each case, the proportion of the triazine curing agent was adjusted to 1.1 times equivalency to oxirane content of the epoxy resin, i.e., to provide 1.1 active hydrogens per oxirane group in the resin. For simplicity, only the nylon, epoxy resin and curing agent are shown in Table D. As before, the shear values are in pounds per square inch and peel values in pounds per inch of width measured at various test temperatures.

TABLE D

| Adhesive composition | | | Shear value at— | | | Peel value at— | | |
|---|---|---|---|---|---|---|---|---|
| Nylon | Epoxy resin | Curing agent | −67° F. | R.T. | 180° F. | −67° F. | R.T. | 180° F. |
| 0 | 100 | 24.2 | 2,690 | 2,855 | 3,500 | 3.0 | 3.0 | 2.0 |
| 20 | 80 | 19.3 | 2,685 | 2,950 | 2,400 | 3.7 | 4.5 | 6.0 |
| 40 | 60 | 14.5 | 4,850 | 4,795 | 4,225 | 14.0 | 48.5 | 71.0 |
| 50 | 50 | 12.1 | 6,100 | 5,700 | 4,915 | 10.0 | 78.0 | 102.5 |
| 70 | 30 | 7.3 | 7,240 | 6,415 | 5,200 | 26.0 | 134.5 | 119.0 |
| 85 | 15 | 3.6 | 8,250 | 5,740 | 4,850 | 37.0 | 180.0 | 143.0 |
| 95 | 5 | 1.2 | 7,560 | 4,125 | 2,700 | 18.0 | 143.0 | 81.5 |

The data of Table D establishes decided preference for at least about 40% and up to 95% nylon based on total nylon plus epoxy resin in forming aluminum-aluminum bonds. However, in other adhesive applications, exceedingly good adhesion has been demonstrated at substantially lowered proportions of nylon. Since nylon is considerably more expensive than epoxy resin at this time, a composition of 15% or less nylon based on total nylon-epoxy resin may be preferred in some instances.

Example IV

When the methanol-soluble nylon in adhesive compositions of Example III was changed from "Zytel" 61 to the above-described "BCI-809," somewhat lower peel and shear values were obtained, but the results were still exceedingly good. Table E, which compares these results to the nylon-free composition, is based on experiments identical to those reported in Example III, Table D, except in the selection of nylon.

TABLE E

| Adhesive composition | | | Shear value at— | | | Peel value at— | | |
|---|---|---|---|---|---|---|---|---|
| Nylon | Epoxy resin | Curing agent | −67° F. | R.T. | 180° F. | −67° F. | R.T. | 180° F. |
| 0 | 100 | 24.2 | 2,690 | 2,855 | 3,500 | 3.0 | 3.0 | 2.0 |
| 70 | 30 | 7.3 | 3,980 | 5,725 | 3,635 | 5.0 | 58.0 | 73.5 |

Example V

Forty-five parts of methanol-soluble nylon ("Zytel" 61) was solvated in methanol-water as in Example I and to this was added a solution of 55 parts of epoxy resin ("DEN 438") and 15 parts of N,N-diallylmelamine curing agent in 13 parts of methyl ethyl ketone. The milky liquid mixture of the solutions was placed in a dip pan at room temperature, and a flat dense layer of continuous filaments, viz., 150 ends per inch of "ECG 150-1/05 end, treatment 038" glass filaments, was drawn in lineal alignment under even tension through the dip pan to produce a continuous resin-coated web. This was fed between squeeze rolls, joined at a pressure roll to a low-adhesion paper liner, and passed through an oven at 250° F. for 10 minutes to provide a nontacky solvent-free reinforced resin web approximately 9 mils in thickness. The resin in the web comprised about 15-20% of the total weight of resin plus glass filaments.

Ten sheets cut from this web were laid up in crossply pattern, with the filaments of each layer at 90° to those of adjacent layers, and placed in a heated platen press. A strong tough monolithic cured panel was obtained after 30 minutes under 200 pounds per square inch in the press which had been preheated to and maintained at 325° F. The cured panel was particularly characterized by its ability, when sawed or cut into pieces, to withstand edge delamination. In this respect it was superior to similar panels of any other resin composition that I have seen.

The resin composition of this example was also noteworthy for staying in place when initially heated in the press. In contrast, many thermosetting resins become water-thin when initially heated to cure temperature, and this involves certain problems such as a tendency toward resin-rich areas in cured structures.

Example VI

A web of glass-filament reinforced resin was prepared by the procedure of the preceding example except that the dip pan contained a solvent-free blend of bisphenol-epichlorhydrin epoxy resin and boron trifluoride-monoethanolamine complex ("BF$_3$400") curing agent heated to 200° F. to attain a flowable consistency. The low adhesion liner to which the web was joined carried a one-mil thick dried coating of the nylon-epoxy resin composition of the preceding example. The pressure roll at which the liner was joined was maintained at 200° F. to fuse the nylon-epoxy film to the resin-coated web. The whole was cooled and wound into a roll for storage.

A number sheets cut and removed from the liner were stacked together to provide a nylon-epoxy film at each interface and cured in a heated platen press under 25 pounds per square inch at 300° F. for 30 minutes. The monolithic cured panel, like that described in the preceding example, was characterized by superior resistance to edge delamination when sawed, sheared, punched or drilled.

Example VII

The nylon-epoxy resin composition of Example V was coated on a long strip of Treatment A electrolytic copper foil weighing 2 ounces per square foot. After drying for 10 minutes at about 170° F. to provide a tack-free adhesive layer of about 1 mil thickness, the coated strip was wound upon itself into a roll for storage.

A piece of the coated copper foil and a stack of uncured sheets of reinforced resin were placed in a heated platen press with the copper foil on the outside and the nylon-epoxy adhesive layer against the first reinforced resin sheet. The reinforced resin sheets had been cut from a continuous web produced essentially as in Example V except that the dip pan contained a solvent-free flowable blend of bisphenol-epichlorhydrin epoxy resin and a curing agent consisting essentially of isophthalyl dihydrazide. After 30 minutes at 300° F. under 25 pounds per square inch, both the resin of the reinforced sheets and the nylon-epoxy adhesive cured to provide a strong copper-faced monolithic panel.

Adhesion of the copper foil to the cured panel was measured by sawing a one-inch wide strip from the laminate, with the lengthwise direction of the strip extending crosswise to the direction of glass fiber reinforcement of the adjacent resinous sheet. The end of the copper strip was then placed in the jaws of a tensile tester at room temperature and pulled from the panel at a peel angle of 90° at the rate of 2 inches per minute. The forces to so peel the copper foil from a number of otherwise identical cured panels, except for variations in proportions in the nylon-epoxy adhesive layer, are recorded in Table F.

TABLE F

| Adhesive composition | | | Peel force at R.T. in lbs per inch width |
|---|---|---|---|
| Nylon | Epoxy resin | Curing agent | |
| 0 | 100 | 27.3 | 9.5 |
| 9 | 91 | 24.8 | 10.5 |
| 13 | 87 | 23.7 | *19 |
| 22 | 78 | 21.3 | *16 |
| 37 | 63 | 17.2 | *14 |
| 74 | 26 | 7.1 | *21 |
| 90 | 10 | 2.7 | *28 |

*Cured panel partially delaminated.

Because at peel forces above 14 pounds per inch of width the failure is partly within the panel of reinforced resin, the adhesion of the compositions comprising at least 13 parts nylon may be substantially higher than the recorded values. Interestingly, in the same test of a great variety of diverse adhesive compositions, I have neither obtained peel forces as large as 14 pounds per inch of width nor observed any delamination within the cured panel. Thus, the degree of adhesion attained with only 13 parts nylon is of considerable importance.

Peel forces in excess of 14 pounds per inch of width in this test were also attained when the adhesive layer coated on the copper foil, comprised methanol-soluble nylon, the above-described "EP-201" epoxy resin and N,N-diallylmelamine; when the nylon was blended with the above-described "Epon 1310" epoxy resin and N,N-diallylmelamine; and when the nylon was blended with the above-described "DEN 438" epoxy resin and

"BF$_3$400"

curing agent or phthalic anhydride curing agent or dicyanadiamide curing agent.

Example VIII

The nylon-epoxy resin adhesive composition of Example V was coated on copper foil as in Example VII with the coating knife at various settings to provide various adhesive thicknesses. The coated copper foil was laminated to a stack of uncured sheets of reinforced resin as in that example. Measured peel forces are recorded in Table G. Before being applied to the copper foil to make Laminate No. 4 of Table G, the adhesive composition was diluted to reduce the proportion of solids 50% and was applied at the same setting of the coating knife as in preparing Laminate No. 3. Laminate No. 5 was prepared by passing a cloth wet with the diluted composition once over the copper foil. It is believed that this dried adhesive layer had a thickness on the order of 0.05 mil.

TABLE G

| Laminate No. | Adhesive thickness in mils | Peel force at R.T. in lbs. per in. width |
|---|---|---|
| 1 | 1.0 | ¹24 |
| 2 | 0.5 | ¹20 |
| 3 | 0.2 | ¹17 |
| 4 | ²0.1 | ¹16 |
| 5 | (³) | ¹14 |

¹ Cured Panel partially delaminated.
² Estimated from Laminate No. 3.
³ Too thin to measure.

Example IX

A stack of reinforced resin sheets cut from a web produced essentially as in Example V, except that the dip pan contained a solvent-free flowable blend consisting of bisphenol-epichlorhydrin epoxy resin and N,N-diallylmelamine, was cured in a heated platen press under 25 pounds per square inch for 30 minutes at 330° F. Against this cured panel was placed the nylon-epoxy adhesive layer of copper foil coated as in Example VII. The one-mil adhesive layer consisted of 17 parts of the nylon, 83 parts of the epoxy resin and 22.6 parts of the curing agent. The whole was then held in a heated platen press at 25 pounds per square inch for 30 minutes at 330° F. The force necessary to peel away the copper foil was 16 pounds per inch of width, and the cured reinforced resin panel was partially delaminated in the test.

Alternatively, the novel adhesive compositon could be coated on the cured panel of reinforced resin rather than on the copper or other metal foil.

While the adhesive compositions of my invention are primarily intended for use in adhering metal to metal, or to rigid plastics or cured resins, they also can be used to bond any similar or dissimilar solid surfaces such as wood, glass, cloth, flexible plastic film, as long as such surfaces are capable of withstanding temperatures necessary to interact the epoxy resin and its curing agent within a reasonable time. An important specific use is in can seaming, and the novel compositions have demonstrated particular utility for seaming black iron and terne plate. For heat-sensitive surfaces, it may be desirable to replace the heat-activatable curing agents of the examples hereinabove with more active materials such as metaphenylene diamine, which must be refrigerated for storability in admixture with epoxy resin. Preferably, alkaline curing agents are employed in amounts equivalent to or slightly in excess of the epoxide equivalent of resin, e.g., to provide about 1.1 active hydrogens per oxirane group in the resin. Polycarboxylic acid anhydrides, which are less preferred, are usually employed in slightly less than equivalent amounts and may be used with a catalyst such as a tertiary amine. Generally, about ½ to 2 times the equivalent amount of curing agent based on epoxide equivalent of resin satisfactorily hardens the epoxy resin.

Unsupported films of heat-cured compositions of my invention also have nonadhesive utilities, e.g., as barriers for liquids or vapors.

Where desired, various pigments, inert fillers (granular or fibrous), or coloring materials may be incorporated in my novel heat-curable adhesive compositions. Fibrous material such as glass or asbestos fibers are advantageous in some uses, e.g., for viscosity control.

I claim:

1. A composition of matter which provides, when cured as a coating on smooth metal surfaces, unusually good resistance to peel forces and high resistance to chemical attack, said composition comprising by weight 13-98 parts of methanol-soluble nylon polyamide, 2-87 parts of epoxy resin, and a curing agent for epoxy resin in amount sufficient to harden the epoxy resin to a thermoset state, said polyamide being a long chain synthetic polymer which has recurring carbonamide groups as an integral part of the main polymer chain and is capable of forming strong cold drawn fibers.

2. The cured product of the composition defined in claim 1.

3. A storable flexible adhesive bonding film which cures to a strong tough chemically-resistant state and when cured in contact with metal surfaces has unusually good resistance to forces tending to peel it from the metal, said adhesive film comprising a blend of methanol-soluble nylon polyamide, epoxy resin of the polyglycidyl ether type, and heat-activatable curing agent for epoxy resin in amount sufficient to harden the epoxy resin to a thermoset state, said polyamide comprising 13-98% of the total weight of said polyamide plus epoxy resin and being a long chain synthetic polymer which has recurring carbonamide groups as an integral part of the main polymer chain and is capable of forming strong cold drawn fibers.

4. The method of making an adhesive composition which provides, when a dried coating thereof is cured on smooth metal surfaces, unusually good resistance to peel forces and high resistance to chemical attack, said method comprising the steps of (a) solvating 13-98 parts by weight of methanol-soluble nylon polyamide in a lower alkyl alcohol having up to about 4 carbon atoms, and (b) providing a milky liquid by mixing with the polyamide solution 2-87 parts of epoxy resin and a curing agent for epoxy resin in amount sufficient to harden the epoxy resin to a thermoset state, said polyamide being a long chain synthetic polymer which has recurring carbonamide groups as an integral part of the main polymer chain and is capable of forming strong cold drawn fibers.

5. A composition of matter which provides, when cured as a coating on smooth metal surfaces, unusually good resistance to peel forces and high resistance to chemical attack, said composition comprising a blend of by weight 40-95 parts of methanol-soluble nylon polyamide, 5-60 parts of epoxy resin of the polyglycidyl ether type, and a heat-activatable curing agent for epoxy resin in amount sufficient to harden the epoxy resin to a thermoset state, said polyamide being a long chain synthetic polymer which has recurring carbonamide groups as an integral part of the main polymer chain and is capable of forming strong cold drawn fibers.

6. A storable adhesive composition which has, upon application as a coating to metal and upon evolution of solvent, the ability to cure to a strong tough chemically-resistant state having unusually good resistance to forces tending to peel the coating from the metal, said composition comprising a milky liquid mixture of methanol-soluble nylon polyamide, epoxy resin of the polyglycidyl ether type, heat-activatable curing agent for epoxy resin in amount sufficient to harden the epoxy resin to a thermoset state, and alcohol-water, said alcohol having up to about 4 carbon atoms in its alkyl component, said polyamide being a long chain synthetic polymer which has recurring carbonamide groups as an integral part of the main polymer chain and is capable of forming strong cold drawn fibers.

7. A stable adhesive composition which provides, when cured as a coating on smooth metal surfaces, unusually good resistance to peel forces and high resistance to chemical attack, said composition comprising a blend of by weight 70-85 parts of methanol-soluble nylon polyamide, 15-30 parts of epoxy resin of the polyglycidyl ether type, and heat-activatable alkaline curing agent for epoxy resin, in amount sufficient to supply about 1.1 active hydrogens per oxirane group of the epoxy resin, said polyamide being a long chain synthetic polymer which has recurring carbonamide groups as an integral part of the main polymer chain and is capable of forming strong cold drawn fibers.

8. Metal sheet carrying a stable coating which when cured exhibits unusually high resistance to peel forces and excellent resistance to chemical attack, said coating comprising a mixture of 40-95 parts by weight of methanol-soluble nylon polyamide, 5-60 parts of epoxy resin of the polyglycidyl ether type, and heat-activatable alkaline curing agent for epoxy resin, ½ to 2 equivalents of curing agent being present per epoxide equivalent of resin, said polyamide being a long chain synthetic polymer which has recurring carbonamide groups as an integral part of the main polymer chain and is capable of forming strong cold drawn fibers.

9. The method of making a storable flexible adhesive bonding film which cures to a strong tough chemically-resistant state and when cured in contact with metal surfaces has unusually good resistance to forces tending to peel it from the metal, said method comprising the steps of (a) solvating 40-95 parts by weight of methanol-soluble nylon polyamide in a lower alkyl alcohol having up to 4 carbon atoms, (b) mixing with the polyamide solution 5-60 parts of epoxy resin together with heat-activatable curing agent for epoxy resin in an amount sufficient to harden the epoxy resin to a thermoset state, (c) coating the liquid polyamide-epoxy mixture on a solid substrate, and (d) drying the coating to provide an adhesive bonding film, said polyamide being a long chain synthetic polymer which has recurring carbonamide groups as an integral part of the main polymer chain and is capable of forming strong cold drawn fibers.

10. The method of making a storable flexible adhesive bonding film which cures to a strong tough chemically-resistant state and when cured in contact with metal surfaces has unusually good resistance to forces tending to peel it from the metal, said method comprising the steps of (a) solvating 70–85 parts by weight of methanol-soluble nylon polyamide in alcohol-water, said alcohol having up to 4 carbon atoms in its alkyl component, (b) mixing with the polyamide solution 15–30 parts of epoxy resin of the polyglycidyl ether type together with heat-activatable curing agent for epoxy resin in an amount sufficient to harden the epoxy resin to a thermoset state, (c) coating the liquid polyamide-epoxy mixture on a low-adhesion carrier, (d) heating to drive off the solvent to provide an adhesive bonding film, and (e) winding the whole into roll form for storage and shipment, said polyamide being a long chain synthetic polymer which has recurring carbonamide groups as an integral part of the main polymer chain and is capable of forming strong cold drawn fibers.

11. A composition of matter which provides, when cured as a coating on smooth metal surfaces, unusually good resistance to peel forces and high resistance to chemical attack, said composition comprising 2–87 parts by weight of epoxy resin, 13–98 parts by weight of methanol-soluble nylon polyamide formed from the reaction of hexamethylenediammonium adipate and hexamethylenediammonium sebacate with caprolactam, and a curing agent for epoxy resin, said polyamide being a long chain synthetic polymer which has recurring carbonamide groups as an integral part of the main polymer chain and is capable of forming strong cold drawn fibers.

12. A composition of matter which provides, when cured as a coating on smooth metal surfaces, unusually good resistance to peel forces and high resistance to chemical attack, said composition comprising a blend of 5–60 parts by weight of epoxy resin, 40–95 parts by weight of methanol-soluble nylon polyamide formed from the reaction of hexamethylenediammonium adipate, hexamethylenediammonium sebacate and caprolactam, and a curing agent for epoxy resin, said polyamide being a long chain synthetic polymer which has recurring carbonamide groups as an integral part of the main polymer chain and is capable of forming strong cold drawn fibers.

References Cited

UNITED STATES PATENTS

| | | | |
|---|---|---|---|
| 2,705,223 | 3/1955 | Renfrew et al. | 260—830 |
| 2,760,944 | 8/1956 | Greenlee | 260—18 |
| 2,962,468 | 11/1960 | Groves | 260—830 |
| 2,970,077 | 1/1961 | Groves | 250—830 |
| 2,986,539 | 5/1961 | Schniepp et al. | 260—830 |

FOREIGN PATENTS 222,527   12/1957   Australia.

SAMUEL H. BLECH, *Primary Examiner.*

PAUL LIEBERMAN, *Assistant Examiner.*

U.S. Cl. X.R.

260—830, 37, 47, 2, 78.5, 37, 33.4; 117—76, 126, 161, 132, 138.8; 161—184, 185, 186 under# REEXAMINATION CERTIFICATE (126th)

United States Patent [19]

Frigstad

[11] B1 3,449,280

[45] Certificate Issued Oct. 4, 1983

[54] ADHESIVE COMPOSITION CONTAINING HIGH MOLECULAR WEIGHT POLYAMIDES, EPOXY RESINS AND CURING AGENTS

[75] Inventor: Robert A. Frigstad, St. Paul, Minn.

[73] Assignee: Minnesota Mining and Manufacturing Company, St. Paul, Minn.

Reexamination Request:
No. 90/000,236, Aug. 2, 1982

Reexamination Certificate for:
Patent No.: 3,449,280
Issued: Jun. 10, 1969
Appl. No.: 24,882
Filed: Apr. 27, 1960

[51] Int. Cl.$^3$ .............................................. C08K 3/20
[52] U.S. Cl. ................................... 523/402; 523/417; 523/420; 427/386; 427/388.2; 428/417; 428/458; 525/423
[58] Field of Search ...................... 523/402, 417, 420; 525/423; 427/386, 388.2; 428/417, 458

[56] References Cited

PUBLICATIONS

BCI Brochure No. 809, Published Nov. 1958.
Black and Blomquist "Metal Surface Effects on Heat Resistance of Adhesive Bonds", *Industrial Engineering Chemistry*, vol. 50, No. 6, pp. 918–921, Jun. 1958.
Black and Blomquist "Relationship of Polymer Structure to Thermal Deterioration of Adhesive Bonds in Metal Joints", Forest Products Laboratory, U.S. Dept. of Agriculture, Forest Service, Madison, Wisc., Library, File dated Jul. 3, 1958.
Henry Lee et al; Epoxy Resins, McGraw-Hill Co. Inc., New York, (1957) pp. 30–44 and 110–114.

*Primary Examiner*—Melvyn I. Marquis

[57] ABSTRACT

Adhesives and coating compositions are prepared from 13–98 parts of high molecular weight methanol-soluble polyamides and 2–87 parts of epoxy resin. In an example 85 parts of a terpolymer of caprolactam, hexamethylene diammonium adipate and hexamethylene diammonium sebacate were solvated in methanol and blended with 15 parts of a diglycidyl ether of bisphenol A and 3.6 parts of 2,-dihydrazino-6-methylamino-s-triazine.

REEXAMINATION CERTIFICATE ISSUED UNDER 35 U.S.C. 307.

ADHESIVE COMPOSITION CONTAINING HIGH MOLECULAR WEIGHT POLYAMIDES, EPOXY RESINS AND CURING AGENTS

NO AMENDMENTS HAVE BEEN MADE TO THE PATENT.

AS A RESULT OF REEXAMINATION, IT HAS BEEN DETERMINED THAT:

The patentability of claims 1-12 is confirmed.

* * * * *